United States Patent [19]

Scales et al.

[11] Patent Number: 4,600,064
[45] Date of Patent: Jul. 15, 1986

[54] EARTH BORING BIT WITH BEARING SLEEVE

[75] Inventors: Stanley R. Scales; Duane E. Shotwell, both of Houston; Gerald O. Atkinson, Pasadena, all of Tex.

[73] Assignee: Hughes Tool Company, Houston, Tex.

[21] Appl. No.: 705,158

[22] Filed: Feb. 25, 1985

[51] Int. Cl.[4] .......................................... E21B 10/20
[52] U.S. Cl. .................................. 175/368; 175/369; 384/96
[58] Field of Search ............................... 175/367–371, 175/374, 337; 384/96, 95, 92

[56] References Cited

U.S. PATENT DOCUMENTS

| | | | |
|---|---|---|---|
| 1,320,384 | 11/1919 | Godbold et al. | 175/368 |
| 1,647,753 | 5/1931 | Scott et al. | 175/368 |
| 1,729,062 | 9/1929 | Bull | 175/368 |
| 1,803,679 | 5/1931 | Scott | 175/368 |
| 1,854,624 | 4/1932 | Powell | 175/367 |
| 1,858,980 | 5/1932 | Behnke | 175/368 |
| 1,873,245 | 8/1932 | Abegg | 175/369 |
| 2,145,573 | 1/1939 | Phipps | 175/368 |
| 2,249,578 | 7/1941 | Phipps | 175/368 |
| 2,654,577 | 10/1953 | Green | 384/96 |
| 3,016,099 | 1/1962 | Woodruff | 175/367 |
| 3,922,038 | 11/1975 | Scales | 175/374 |
| 4,344,658 | 8/1982 | Ledgerwood | 308/8.2 |

Primary Examiner—James A. Leppink
Assistant Examiner—Hoang C. Dang
Attorney, Agent, or Firm—Robert A. Felsman

[57] ABSTRACT

An earth boring bit having an improved two piece bearing construction using an internally tapered and threaded, cantilevered bearing lug extending obliquely inwardly and downwardly from a leg carried by the body of the bit. An internally tapered and threaded bearing sleeve is made up on the lug, and includes a mouth that engages a shoulder on a base region of the bearing lug. The mouth of the sleeve has a minimum radial thickness such that the sleeve may be made up to a selected minimum torque. The bearing sleeve has a length greater than that of the treaded portion to define a thick walled inner end region to receive a resilient retainer ring in a groove that provides a minimum section over the threads on the interior of the sleeve. The sleeve is boronized to achieve wear resistance in a manner that does not substantially reduce strength.

10 Claims, 1 Drawing Figure

EARTH BORING BIT WITH BEARING SLEEVE

BACKGROUND OF THE INVENTION

1. Field of the Invention

This invention relates generally to earth boring, especially to improvements to bits having cutters rotatably secured to bearing shafts.

2. Background Information

The conventional contemporary way to manufacture an earth boring drill (rock) bit is to forge a body of low alloy steel to a finished shape that includes a rough bearing envelope, and then to machine an integral bearing shaft or pin to a final shape. The resulting head section (of which there are usually three) is then carburized and heat treated to provide the requisite strength and wear resistance to the bearing shaft, while leaving the supporting leg with the desired ductility and strength.

Machining of the bearing shaft is considered relatively difficult due to the complex shape of a head section, and selective heat treatment to harden primarily the bearing area is troublesome, often requiring sectionalized copper plating and subsequent stripping.

Seemingly, it would be attractive to manufacture the bearing shaft as a separate unit--if a practical and strong method could be found to replace the strong and proven integral structure favored now by bit manufacturers.

Indeed, the concept of manufacturing the bearing as a separate unit is not new, and may be seen in the U.S. Pat. No. 1,803,679 of F. L. Scott, "Drill Cutter Retainer Means", May 5, 1931. Here, the bearing sleeve has a conical exterior and is secured to a threaded bearing lug. A resilient retainer ring of polygon cross section, located radially above the threads on the lug and inside the bearing sleeve, is used to retain the cutter on the bearing shaft. Another arrangement using a threaded lug and sleeve may be seen in one of the early rock bits, U.S. Pat. No. 1,320,384, which used a threaded retainer ring to retain the cutter on a bearing lug and sleeve combination. Other examples of bearing sleeve constructions may be seen in U.S. Pat. Nos. 3,998,500, 4,266,622 and 4,235,295. In addition there are being sold commercially by Reed Tool Company of Houston, Texas bits using a forged and machined lug welded to cast bit bodies.

Further, Hughes Tool Company, the assignee of applicants, has manufactured and sold a large diameter bit which has a bearing sleeve attached to a bearing lug by the shrink fit process after aligning the passageways in the sleeve and the leg of the bit to enable retention of the cutter with what is known as the "ball lock" method.

With the introduction of electron beam welding to rock bit manufacture, attention has turned to this method of attaching a bearing shaft to the leg of a bit, as may be seen in U.S. Pat. Nos. 4,043,411 and 4,127,043.

And yet, the more popular sizes of rock bits still use today the integral bearing pin and leg, which has been the standard in the industry since the 1930s. Over fifty years of usage has proven this to be the best and most reliable method of forming a bearing on the shaft of a rock bit.

SUMMARY OF THE INVENTION

The general object of the invention is to provide, in an earth boring bit, an improved bearing sleeve and cutter retention means which have the strength and reliability to perform effectively against the integral bearing shaft and leg structures in even the more popular sizes of bits such as those of 12¼ inch diameter.

In accordance with the above and other objects there is provided in a rock bit a threaded lug which extends downwardly and outwardly from the leg in cantilevered fashion. A tapered thread is formed on the bearing lug to diverge outwardly from an inner, end region to an outer, base region that includes a shoulder transverse to the axis of the lug. An internally tapered and threaded bearing sleeve, having a substantially cylindrical, here boronized, bearing surface, is made up on the lug, and includes a mouth that forcibly and sealingly engages the shoulder on the base region of the lug. The bearing sleeve has a length greater than that of the threaded portion to define a thick walled inner end region, the cylindrical outer surface of which recives a snap ring assembly groove that should have a rounded bottom. A mating retainer groove is formed on the opposed cylindrical bearing surface of the cutter and a resilient snap ring is positioned in the two grooves to retain the cutter on the bearing lug. The mouth of the bearing sleeve for a 12¼ inch diameter bit has a thickness and a metallurgical composition to provide a torsional yield strength of substantially 6000 foot pounds. The mouth of the bearing sleeve of the bit should have a radial thickness of not less than substantially 0.230 inch. The minimum section between the assembly groove and the threaded portion of the bearing sleeve should be 0.281 inch.

The above as well as additional objects, features and advantages of the invention will become apparent in the following description.

DESCRIPTION OF THE DRAWING

The sole FIGURE of the drawing is a fragmentary, side elevational view, partially in longitudinal section of an earth boring bit which embodies the principles of the invention.

DESCRIPTION OF THE PREFERRED EMBODIMENT

Figure 1:
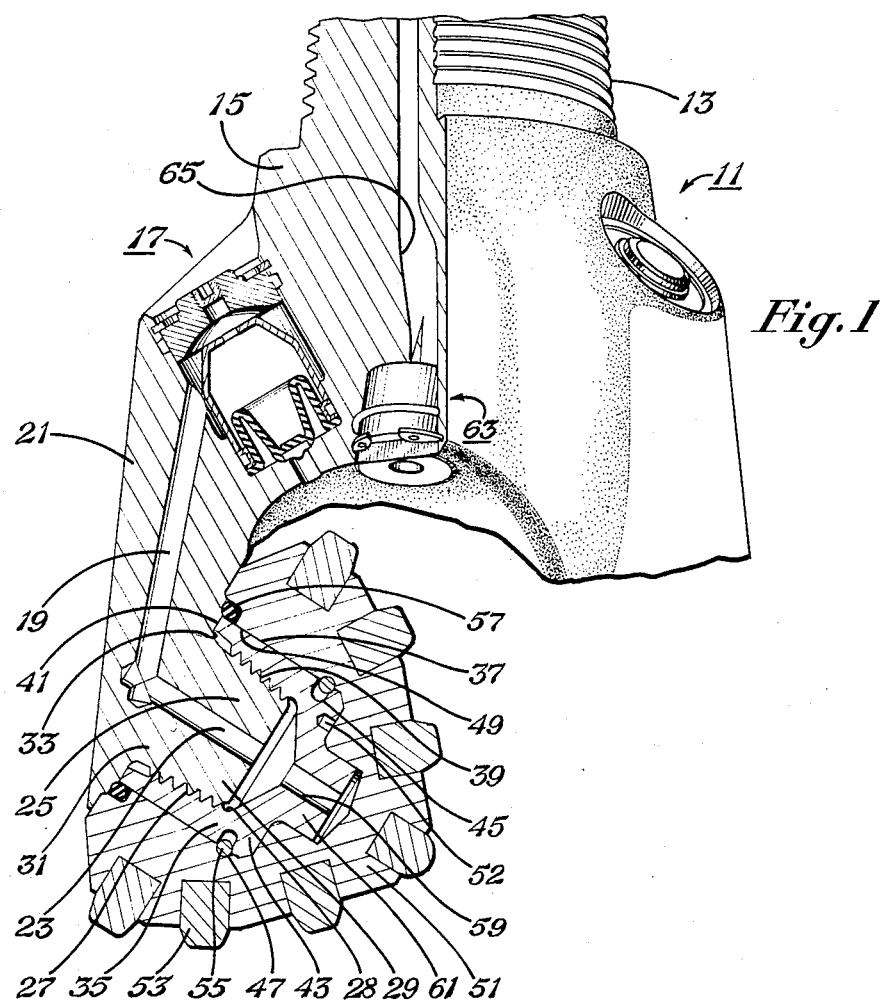

The numeral 11 of the drawing represents the body of an earth boring or rock bit which is threaded at its upper end 13 for attachment to a drill string member (not shown), the body normally consisting of three head sections such as the one 15 shown in longitudinal section.

In an upper portion of each head section 15 is a compensator 17 used as a part of a lubrication system that includes passages 19, a preferred form of compensator being that shown in the patent to Stuart C. Millsapps, Jr., U.S. Pat. No. 4,276,946. A part of passage extends through the leg 21 of head section 15 into intersection with another portion 23, formed in this instance coaxially with a bearing lug 25 extending obliquely downwardly and inwardly from the leg 21.

A thread 27, with a thread run-out 28, is formed on the exterior of the bearing lug 25, diverging outwardly from an inner end region 29 to an outer base region 31, having a shoulder 33 which is transverse or perpendicular with respect to the rotational axis of the lug. The thread form and dimensions are the same as those of a 2⅜ A.P.I. regular tool joint used on drill stem, with the length of the thread engagement shortened.

Attached to the bearing lug 25 is a bearing sleeve 35 having a substantially cylindrical exterior bearing surface 37, a tapered and threaded interior portion 39 that mates with the threads 27 of the lug 25, and a mouth 41 that mates with the shoulder 33 of the base region 31 of the lug 25. The radially measured thickness of the mouth 41 is not less than substantially 0.230 inch, for the 12¼ inch bit provided by way of example, the sleeve being made from a metal alloy with a minimum yield strength so as to provide a torsional yield strength of not less than substantially 6000 foot pounds.

From the drawing it is apparent that the bearing sleeve 35 and its cylindrical portion 37 has a length greater than that of its threaded portion 39 to define a thick walled inner end portion 43, in which is formed an assembly groove 45 that opposes a retainer groove 47 formed in the cylindrical portion 49 of the cutter 51. The minimum thickness of the metal between the assembly groove 45 and the threaded portion 39 of the bearing sleeve 35 for the 12¼ diameter bit provided by way of example should not be less than substantially 0.281 inch. A drive pin hole 52 provides a means to apply the selected torque to the sleeve on assembly with the lug 25. The cutter is of a conventional configuration, with earth disintegrating teeth 53, and is retained on the bearing sleeve 35 with a resilient snap ring 55 having a curved cross section and groove configuration with curved bottom portions the type disclosed in the U.S. Pat. No. 4,236,764 of Edward M. Galle.

The sleeve 35 has a boronizing treatment of the type described in Stanley R. Scales U.S. Pat. No. 3,922,038 on the exterior cylindrical surface 37 to improve wear resistance. This treatment provides the requisite improvement to wear resistance without causing a substantial weakening of the sleeve.

The cutter is sealed on the bearing sleeve 35 by seal means 57 such as that disclosed in the U.S. Pat. No. 3,397,928 of Edward M. Galle to retain lubricant which is fed from the compensator 17, passages 19 and through a passage 59 extending through the pilot pin 61 of the bearing sleeve 35.

Although not critical to the invention, the drawing shows a nozzle means 63 connected with an internal cavity 65 of the bit body 11 to direct a stream of high velocity drilling fluid against the bottom of the bore hole.

In operation the body 11 of the bit is connected by threads of the upper end 13 of a drill string member (not shown) which will lower and rotate the bit in a bore hole. During drilling operations the compensator 17 will minimize the pressure differential across the seal means 57 and will assure lubrication of the bearing means of the bit. The cutter 51 will therefore rotate on the bearing means, specifically on the bearing sleeve 35, which during assembly was made up against the shoulder 33 by use of the drive pin hole 52 to the above described minimum torque to maintain the sleeve on the bearing lug 25 even under surprisingly adverse conditions.

The advantages of the invention should be apparent in view of the previous description, especially the ability to manufacture the finished bearing of each head section of a metallurgical composition differing from that of the body of the bit. Thus, the bit body may be selected for properties of ductility and strength, while the bearing sleeve may be selected for hardness, lubricity and the other properties advantageous to bearing surfaces. The use of a bearing sleeve which has a tapered thread and a mouth of a relatively large radial thickness contributes to the rugged strength of the structure, and the provision of a boronized or equivalent sleeve having a length greater than that of the threaded lug on which it is assembled enables the use of a retainer ring and groove configuration that has a maximum cross sectional thickness. As a consequence the torsional strength and the fatigue resistance of the two piece bearing structure are sufficient to withstand the rigorous conditions encountered during earth drilling operations.

While we have shown our invention in only one of its forms, it should be apparent to those skilled in the art that it is not thus limited, but is susceptible to various changes and modifications without departing from the principles which it embodies.

We claim:

1. an earth boring bit having an improved bearing sleeve and cutter retention means which comprises:
    a bit body which includes at least one leg and a cantilevered bearing lug that extends downwardly and inwardly;
    a thread formed on the bearing lug, tapered to diverge outwardly from an inner, end region to an outer, base region having a transverse shoulder;
    a bearing sleeve with a substantially cylindrical bearing surface secured to the bearing lug, having a mouth at one end and a threaded portion, the mouth engaging respectively the transverse shoulder;
    the bearing sleeve having a length greater than that of its threaded portion to define a thick walled end region;
    a rotatable cutter with a cylindrical bearing surface assembled on the bearing sleeve;
    an assembly groove formed on the cylindrical surface of the bearing sleeve and in the thick walled end region at a location removed from the thread of the bearing lug and threaded portion of the bearing sleeve;
    a mating, retainer groove formed in the rotatable cutter;
    a resilient snap ring positioned in the mating assembly and retainer grooves to retain the cutter on the bearing shaft.

2. The invention defined by claim 1 wherein the cylindrical bearing surface is treated for wear resistance with a treatment of the boronizing type.

3. The invention defined by claim 1 wherein the resilient ring has a curved cross section and mating curved bottom portions are formed in the assembly and retainer grooves.

4. An earth boring bit having an improved bearing sleeve and cutter retention means which comprises:
    a bit body which includes at least one leg and a cantilevered bearing lug that extends downwardly and inwardly;
    a thread formed on the bearing lug, tapered to diverge outwardly from an inner, end region to an outer, base region having a transverse shoulder;
    a bearing sleeve with a substantially cylindrical bearing surface secured to the bearing lug, having a mouth at one end and a thread portion that engage respectively the transverse shoulder and threads of the lug;
    the bearing sleeve having a length greater than that of its threaded portion to define a thick walled end region;

a rotatable cutter with a cylindrical bearing surface assembled on the bearing sleeve;

an assembly groove formed on the cylindrical surface of the bearing sleeve and in the thick walled end region at a location removed from the thread of the bearing lug and threaded portion of the bearing sleeve a mating, retainer groove formed in the rotatable cutter;

a resilient snap ring positioned in the mating assembly and retainer grooves to retain the cutter on the bearing shaft;

the mouth of the bearing sleeve having a thickness and a metallurgical composition to provide a torsional yield strength of substantially 6000 foot pounds.

5. The invention defined by claim 4 wherein the cylindrical bearing surface is treated for wear resistance with a treatment of the boronizing type.

6. The invention defined by claim 4 wherein the resilient ring has a curved cross section and mating curved bottom portions are formed in the assembly and retainer grooves.

7. An earth boring bit having an improved bearing sleeve and cutter retention means which comprises:
- a bit body which includes at least one leg and a cantilevered bearing lug that extends downwardly and inwardly;
- a thread formed on the bearing lug, tapered to diverge outwardly from an inner, end region to an outer, base region having a transverse shoulder;
- a bearing sleeve with a substantially cylindrical bearing surface secured to the bearing lug, having a mouth at one end and a thread portion that engage respectively the transverse shoulder and threads of the lug;
- the bearing sleeve having a length greater than that of its threaded portion to define a thick walled end region;
- a rotatable cutter with a cylindrical bearing surface assembled on the bearing sleeve;
- an assembly groove formed on the cylindrical surface of the bearing sleeve and in the thick walled end region at a location removed from the thread of the bearing lug and threaded portion of the bearing sleeve;
- a mating, retainer groove formed in the rotatable cutter;
- a resilient snap ring positioned in the mating assembly and retainer grooves to retain the cutter on the bearing shaft;
- the mouth of the bearing sleeve having a radial thickness of not less than substantially 0.230 inch and a metallurgical composition to provide a torsional yield strength of substantially 6000 foot pounds.

8. The invention defined by claim 7 wherein the thickness of the metal between the assembly groove and the threaded portion of the bearing sleeve is not less than substantially 0.281 inch.

9. The invention defined by claim 7 wherein the cylindrical bearing surface is treated for wear resistance with a treatment of the boronizing type.

10. The invention defined by claim 7 wherein the resilient ring has a curved cross section and mating curved bottom portions are formed in the assembly and retainer grooves.

* * * * *

UNITED STATES PATENT AND TRADEMARK OFFICE
CERTIFICATE OF CORRECTION

PATENT NO. : 4,600,064

DATED : July 15, 1986

INVENTOR(S) : Scales et al.

It is certified that error appears in the above-identified patent and that said Letters Patent is hereby corrected as shown below:

In the identification of the assignee, "Hughes Tool Company" should read --Hughes Tool Company-USA--.

Column 2, line 55, after the word "passage", insert the numeral --19--.

Claim 1, column 4, line 18, change the word "an" to read --An--.

Claim 4, column 5, line 7, after the word "sleeve", insert a semicolon.

Signed and Sealed this

Twenty-third Day of December, 1986

*Attest:*

DONALD J. QUIGG

*Attesting Officer*  *Commissioner of Patents and Trademarks*